US012217072B2

(12) United States Patent
Waterman

(10) Patent No.: US 12,217,072 B2
(45) Date of Patent: Feb. 4, 2025

(54) GRAPHICAL USER INTERFACES

(71) Applicant: NCR Voyix Corporation, Atlanta, GA (US)

(72) Inventor: Simon Waterman, Somerset (GB)

(73) Assignee: NCR Voyix Corporation, Atlanta, GA (US)

( * ) Notice: Subject to any disclaimer, the term of this patent is extended or adjusted under 35 U.S.C. 154(b) by 39 days.

(21) Appl. No.: 18/088,014

(22) Filed: Dec. 23, 2022

(65) Prior Publication Data

US 2024/0211285 A1  Jun. 27, 2024

(51) Int. Cl.
*G06F 9/451* (2018.01)
*G06Q 20/18* (2012.01)

(52) U.S. Cl.
CPC ............. *G06F 9/453* (2018.02); *G06Q 20/18* (2013.01)

(58) Field of Classification Search
CPC ................................ G06F 9/453; G06Q 20/18
See application file for complete search history.

(56) References Cited

U.S. PATENT DOCUMENTS

| | | | | |
|---|---|---|---|---|
| 11,543,945 B1* | 1/2023 | Paola | ...................... | H04L 67/08 |
| 11,604,657 B2* | 3/2023 | Singh | ................... | G06Q 20/202 |
| 11,776,507 B1* | 10/2023 | Svirid | .................... | G09G 5/363 |
| | | | | 345/522 |
| 2005/0071744 A1* | 3/2005 | Dunbar | ................ | G11B 27/309 |
| 2005/0283757 A1* | 12/2005 | Fleming | .................. | G06F 9/451 |
| | | | | 717/113 |
| 2011/0066671 A1* | 3/2011 | Motohashi | .......... | G03B 21/006 |
| | | | | 709/201 |
| 2012/0017213 A1* | 1/2012 | Hunt | ...................... | G06F 21/53 |
| | | | | 718/100 |
| 2017/0177860 A1* | 6/2017 | Suarez | .................... | G06F 21/53 |
| 2017/0177877 A1* | 6/2017 | Suarez | ............... | G06F 21/6218 |
| 2017/0180346 A1* | 6/2017 | Suarez | ............... | G06F 9/45558 |
| 2018/0052637 A1* | 2/2018 | Chen | ................ | G06F 16/24578 |
| 2019/0042320 A1* | 2/2019 | Prince | ................... | G06F 9/5077 |
| 2019/0392045 A1* | 12/2019 | De Lima Junior | . | G06F 12/0875 |
| 2020/0326931 A1* | 10/2020 | Nadgowda | ............ | H04L 41/085 |
| 2022/0092192 A1* | 3/2022 | Wolfson | .............. | G06F 9/45545 |
| 2023/0043336 A1* | 2/2023 | Mitkar | ................... | G06F 3/0659 |
| 2023/0045110 A1* | 2/2023 | Ranganathan | .......... | G06F 21/53 |
| 2023/0091587 A1* | 3/2023 | Jang | ......................... | G06F 8/63 |
| | | | | 717/177 |

* cited by examiner

*Primary Examiner* — Tadesse Hailu
(74) *Attorney, Agent, or Firm* — Notaro, Michalos & Zaccaria P.C.; John S. Economou

(57) ABSTRACT

A method, a computing device and a computer program is disclosed. The method comprises providing, at a computing device, at least one first executable image file comprising first executable software associated with a graphical user interface application; and executing the first executable image file as at least one first software container element that contains the first executable software and that is executable on one or more processors of the computing device; and responsive to executing the first executable image file, providing a first graphical user interface on a display of the computing device.

20 Claims, 6 Drawing Sheets

GRAPHICAL USER INTERFACES

FIELD OF THE INVENTION

The present invention relates to a method and apparatus for providing a graphical user interface (GUI) on a display of a computing device. In particular, but not exclusively, the present invention relates to a method of providing the executable software associated with a Graphical User Interface application as an executable image file that is executable as a software container element, which when executed, provides a graphical user interface on the display via communicating with another software container element which contains software associated with components of a GUI infrastructure/framework.

BACKGROUND

It is known that self-service terminals (SSTs) and/or Point of Sale (POS) terminals and/or kiosks are used from time to time in the retail industry. SSTs, POS terminals and kiosks are typically used to enable a customer to conduct transactions with a retail establishment. Each SST, POS terminal or kiosk in any retail establishment may be connected to different peripheral devices. Each SST, POS terminal or kiosk may also execute different software, such as having different underlying operating systems (Linux, Windows etc.) and different software applications. This is typically dependent upon the retail establishment where the SST, POS terminal or kiosk is used, and the intended use of the SST, POS terminal or kiosk in the retail establishment. From time to time, the software executing on the SST, POS terminal or kiosk may also be upgraded or the connected peripheral devices may change. It will also be appreciated that each SST, POS terminal or kiosk may also render a specific graphical user interface (GUI) or a series of different GUIs according to the needs of the terminal/kiosk.

Due to the variations that are often present from terminal to terminal, software developers have started making use of software containers that contain the software that needs to be executed on terminals. Software containers isolate the running software thus helping to avoid complex platform dependencies. That is to say that they are able to execute on one or more processors of a terminal independent of the computing environment of that terminal. This is because a software container contains all of the software (application code as well as any software dependencies) it needs to be executable in any computing environment. Additionally, as these containers operate in their own isolated computing environment (except for certain predefined communication pathways with other software/hardware (such as access to specific files, specific ports) outside the software container), this also makes them particularly secure. Software containers are thus an effective way of packaging and distributing software for use on terminals and kiosks. When a software or hardware upgrade is performed on a terminal, a new software container can be executed on the terminal that accounts for these upgrades. Also, since the containers can be pre-built, this can help avoid complex builds on every terminal. It is noted that software containers are different to virtual machines in that they do not require a hypervisor to be installed on the computing device. Software containers are also typically more lightweight and run faster than virtual machines. Furthermore, whereas virtual machines virtualise the entire computer system, software containers virtualise the operating system. Software containers also share a single operating system whereas each virtual machine has its own operating system.

When deploying a software container, a container engine (such as docker, RKT, CRI-O, and LXD or the like) is utilised. The container engine can accept user requests or requests from an API server of a container orchestrator (such as Kubernetes, Swarm, Mesos, or the like), pull image files (in a particular image format) from a registry, prepare a container mount point, prepare metadata that is needed to execute a software container and call a container runtime. The container runtime is a part of the container engine. The container runtime (such as runc, containerd, crun, railcar, katacontainers, or the like) uses the mount point and the metadata provided by the container engine and communicates with the kernel (of a host OS) running on the computing device in order to execute a container image file and thereby create a software container.

When implementing multiple containers across multiple computing devices, a software container orchestrator platform is often used. These platforms are able to schedule container workloads across multiple computing devices (e.g., SSTs, POS terminals or kiosks) and are also able to provide a standardized application definition file (e.g., kube YAML, docker compose, or the like). Kubernetes is an example of a container orchestration platform.

A Kubernetes container orchestration platform is a cluster of units, including a controlling unit called the Kubernetes master, which manages the cluster, and at least one node (or worker) which runs workloads (containers). One part of the Kubernetes orchestrator platform is the kubelet. The kubelet is an agent that runs on every worker which is part of the Kubernetes system. During operation, the kubelet receives commands (from an API server on a Kubernetes master) that informs the kubelet what container(s) should be running on a computing device. In Kubernetes, these containers are provided within 'pods'. Typically, a single pod includes a single container although it is possible to include multiple containers within a pod. The kubelet passes information regarding what container(s) should be running on a computing device to a container engine (e.g., via a Container Runtime Interface (CRI)) for execution of a software container via a container runtime within the container engine.

A software container is created when a container runtime executes an executable container image file. As such, a software container is essentially a runtime instance of an associated executable container image file. In this sense, an executable container image file is an image file that has all of the software it needs to at least be executable as a software container element. In more detail, a container image file is typically a binary file that includes all the necessary requirements for running a software container, in addition to any metadata describing needs and capabilities of the software container. The container image file itself is made up of several layers that define the executable instructions needed for running the software container. For example, a container image file may include several layer(s) which define a software application(s) executable code, several layers(s) defining code for any software dependencies upon which the software application(s) rely, and several layer(s) defining code for any required configuration settings. Container image files are often stored in a container image registry. Each container image file is stored in a particular container image format that defines the layers and metadata within a container image file. For example, the Open Container Initiative (OCI) image format defines the image file as tar files for each layer and a manifest file in JSON format which specifies the metadata associated with the image file.

However, to date the use of containers has been completely overlooked when running GUI applications as part of a microservices architecture. Unlike the supporting microservices, the GUI components are typically deployed using traditional techniques onto bare-metal or sometimes inside a virtual machine. Where attempts have been made to isolate GUI applications inside a sandbox, such as Flatpak, AppImage or Snap, the approaches taken typically suffer from various limitations. For example, they do not provide full sandbox isolation for most applications, leaving security vulnerabilities. They also require special sandboxing technology which are often not compatible with the backend microservices. They also may be difficult to update.

SUMMARY

Aspects of the invention provide technical solutions that at least partly mitigate one or more of the above-mentioned problems.

Certain embodiments of the present invention provide a GUI application within a software container element.

By providing the GUI application in a software container environment, enhanced security may thereby be provided. This may be particularly important when the GUI applications are used in retail environments (where terminals and kiosks are used) because of the proximity to unknown and untrusted users. Furthermore, new features and fixes for the application may also be rapidly deployed, unlocking the potential for continuous delivery of updated application software.

Certain embodiments of the present invention provide a GUI application in one software container element and GUI infrastructure components within another software container element. This further enhances security of the terminal/kiosk.

Certain embodiments of the present invention enable the provision of a particular GUI application on a terminal/kiosk 'on the fly' by providing a set of customised GUI applications as executable image files that can be selected and executed as required in response to certain events taking place on the kiosk/terminal.

Certain embodiments of the present invention enable the building of executable image files by using a tool that automatically converts a pre-existing non-container based sandbox (e.g., Flatpak or AppImage) application into executable image files. This means a large library of third-party GUI applications can be rapidly converted to run within software containers.

According to a first aspect of the present invention there is provided a computer-implemented method for providing a graphical user interface on a display of a computing device, comprising the steps of: providing, at a computing device, at least one first executable image file comprising first executable software associated with a graphical user interface application; and executing the first executable image file as at least one first software container element that contains the first executable software and that is executable on one or more processors of the computing device; and responsive to executing the first executable image file, providing a first graphical user interface on a display of the computing device.

Aptly, the method further comprises: providing a second executable image file comprising second executable software associated with graphical user interface infrastructure components that support the graphical user interface application; and executing the second executable image file as a second software container element that contains the second executable software and that is executable on said one or more processors of the computing device.

Aptly, the method further comprises: providing the first executable image file as an image file that comprises executable software associated with the graphical user interface application and one or more graphical user interface toolkits.

Aptly, the method further comprises: providing the second executable image file comprises providing the second executable image file as an image file that comprises executable software associated with a display server.

Aptly, the method further comprises: providing the second executable image file comprises providing the second executable image file as an image file that comprises executable software associated with a windows manager.

Aptly, the method further comprises: providing the second executable image file comprises providing the second executable image file as an image file that comprises executable software associated with one or more graphical user interface toolkits.

Aptly, the method further comprises: providing the second executable image file comprises providing the second executable image file as an image file that comprises executable software associated with a user interface input manager.

Aptly, the method further comprises: building one or more respective first executable image files by converting one or more respective pre-determined non-software container element based sandbox implementations of the respective graphical user interface application into respective executable image files.

Aptly, the method further comprises: storing, in at least one memory on the computing device and/or in a remote server, a plurality of executable image files each comprising respective executable software associated with a respective graphical user interface application for providing a respective graphical user interface.

Aptly, the method further comprises: providing, at the computing device, the first executable image file from the plurality of executable image files stored in said memory; executing the first executable image file as the first software container element; and thereby providing the first graphical user interface on the display.

Aptly, the method further comprises: responsive to detecting a predetermined event on the computing device, executing at least one other executable image file, from the plurality of executable image files, and different to the first executable image file, as at least one other software container element on said one or more processors of the computing device; and responsive to executing the other executable image file, providing a second graphical user interface on the display of the computing device.

Aptly, the method further comprises: responsive to executing said other executable image file, terminating the first software container element or minimizing or controlling a size and/or position of the first graphical user interface or moving the first graphical user interface into a background whilst the second graphical user interface is active.

Aptly, the method further comprises: responsive to said detecting of the predetermined event, dynamically assembling the other executable image file for execution as said other software container element.

Aptly, the method further comprises: configuring the first software container element such that it is able to communicate with the display, the second software container element and one or more user input devices.

Aptly, the method further comprises: via the second software container element, mounting one or more communication socket addresses into the first software container element to enable communicate between the first and second software container element.

Aptly, the method further comprises: via the first software container element, providing display instructions directly to a display buffer executing on a kernel of the computing device; and responsive to providing the display instructions, commanding, via the display buffer, a graphical processing unit to provide the first graphical user interface on the display;

or, via the first software container element, providing display instructions directly to the second software container element; via the second software container element, providing said display instructions to a display buffer executing on a kernel of the computing device; and responsive to providing the display instructions to the display buffer, via the display buffer, commanding a graphical processing unit to provide the first graphical user interface on the display.

Aptly, the method further comprises: at the second software container element, receiving one or more user input commands associated with inputs from one or more user input devices; transmitting said input commands from the second software container element to the first software container element; and responsive to transmitting, providing updated display instructions from the first software container element to cause the first graphical user interface to be updated.

According to a second aspect of the present invention there is provided a computing device comprising a display for providing a graphical user interface, comprising: one or more processors configured to: execute at least one first executable image file, comprising first executable software associated with a graphical user interface application, as at least one first software container element that contains the first executable software, to thereby provide a first graphical user interface on the display of the computing device.

Aptly, the computing device is a point of sale terminal or self-service terminal or kiosk.

According to a third aspect of the present invention there is provided a computer program comprising instructions which, when executed by a computing device, cause the computing device to carry out the steps of the method defined by the first aspect of the present invention.

Certain embodiments of the present invention provide GUI applications within software container elements running on SSTs, POS terminals or kiosks, thus enhancing security of the terminals/kiosks.

Certain embodiments of the present invention enable untrusted third-party GUI applications to be hosted in kiosk-like environments without compromising security. This is because if the GUI application itself has a vulnerability an attacker would find themselves still confined within the GUI container and therefore unable to (or very likely unable to) compromise other applications or the system as a whole. This might for example be useful in a retail store, for example, to run a web-based stock control application developed by a customer and hosted on the public internet.

Certain embodiments of the present invention help enable the cost of developing, deploying and operating GUI applications to be reduced. This is because both the GUI and the backend microservices can be operated within a container environment, thus simplifying the overall architecture. Furthermore, this enables the same systems to be used for deploying and managing GUI applications and backend microservices.

Certain embodiments of the present invention also help enable security to be improved because GUI applications are isolated from each other and from the bare-metal of a terminal/kiosk, enabling deployment of untrusted third-party GUI applications in retail environments. Security is also improved because GUI applications do not need to be installed or run upon bare-metal of a terminal and thus the bare-metal OS can be treated like an appliance.

Certain embodiments of the present invention provide a mechanism of abstracting GUI applications executable as software containers, enabling a controller to dynamically select and run the GUI application needed on a particular terminal/kiosk at a specific point in time.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
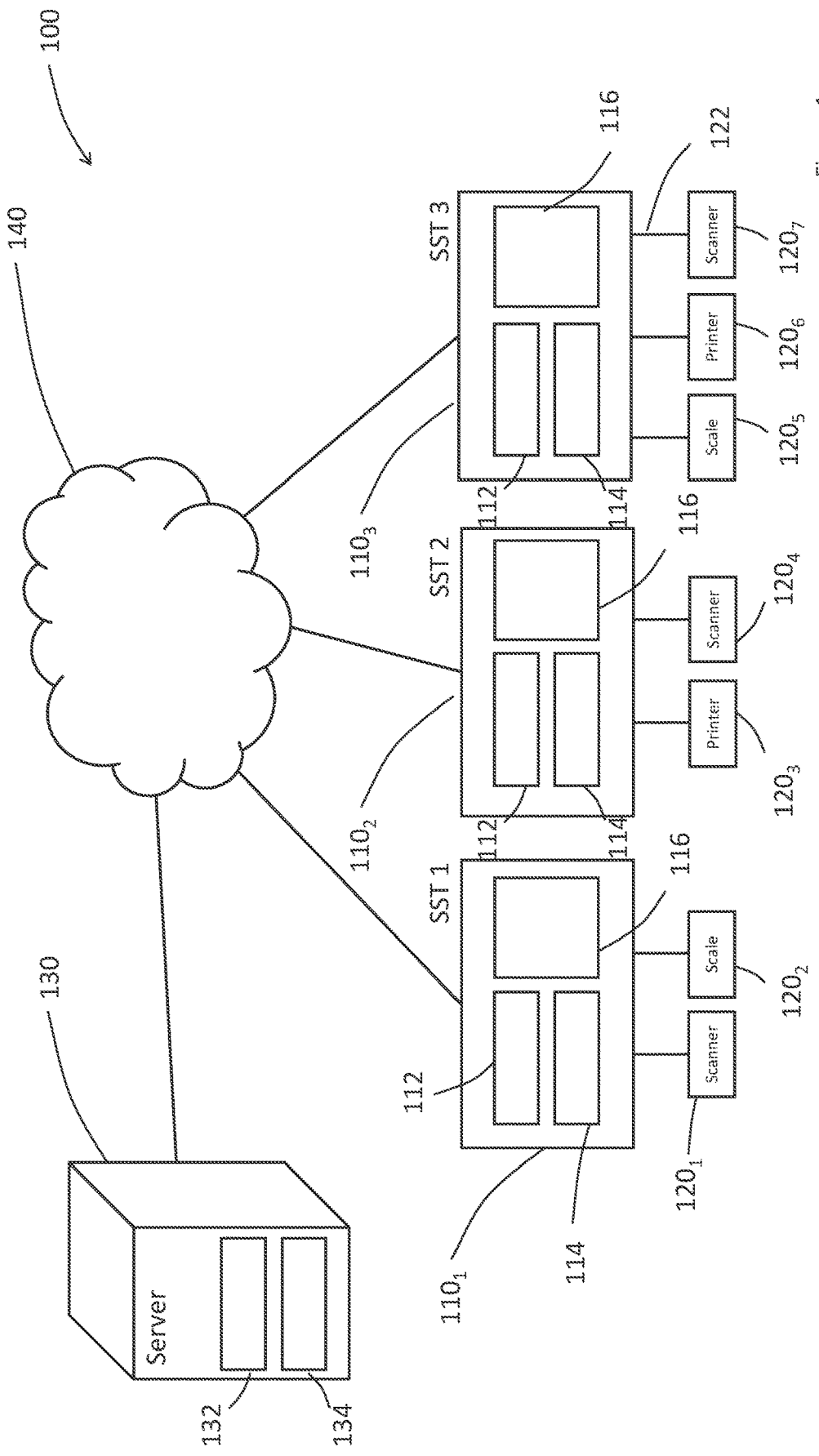
FIG. 1 illustrates a computing system.

FIG. 1 illustrates a computing system 100. In the computing system 100 there are three self-service terminals (SSTs) 110$_1$, 110$_2$, 110$_3$. The SSTs are an example of a computing device. In certain other embodiments of the present invention, the computing device may be a Point of Sale (POS) terminal, a kiosk, an Automated Teller Machine (ATM), a personal computer, a laptop, a tablet or the like. Each SST includes one or more processors 112, at least one memory 114 and a display. The memory is a non-transitory computer-readable storage medium. The memory 114 stores executable software that is executable by the processors 112 of the SST. The displays 116 display a graphical user interface (GUI). Each SST may also include a communication interface (not shown) for communicating with a server and one or more communication interfaces (not shown) for communicating with connected peripheral devices. In the system illustrated in FIG. 1, a scanner peripheral device 120$_1$ and a scale peripheral device 120$_2$ is connected to the first SST 110$_1$. Also, a printer peripheral device 120$_3$ and a scanner peripheral device 120$_4$ is connected to the second SST 110$_2$. Also, a scale peripheral device 120$_5$, printer peripheral device 120$_6$ and scanner peripheral device 120$_7$ are connected to the third SST 110$_3$. It will be appreciated in certain other embodiments of the present invention each SST may be connected to different combinations of peripheral device. Each peripheral device may communicate with the SST it is connected to via a wired interface 122. It will be appreciated that in certain other embodiments of the present invention the interface may be wireless or a combination of wired and wireless. Each SST communicates with a server 130 via a network 140. The server is also an example of a computing device. The network 140 may be wired, wireless or a combination of wired and wireless. The server 130 also includes one or more processors 132 and at least one memory 134. The memory 134 is also a non-transitory computer readable storage medium. The memory 134 stores executable software that is executable by the processors of the server. The executable software of the SSTs and the server will be described in more detail below.

Figure 2:
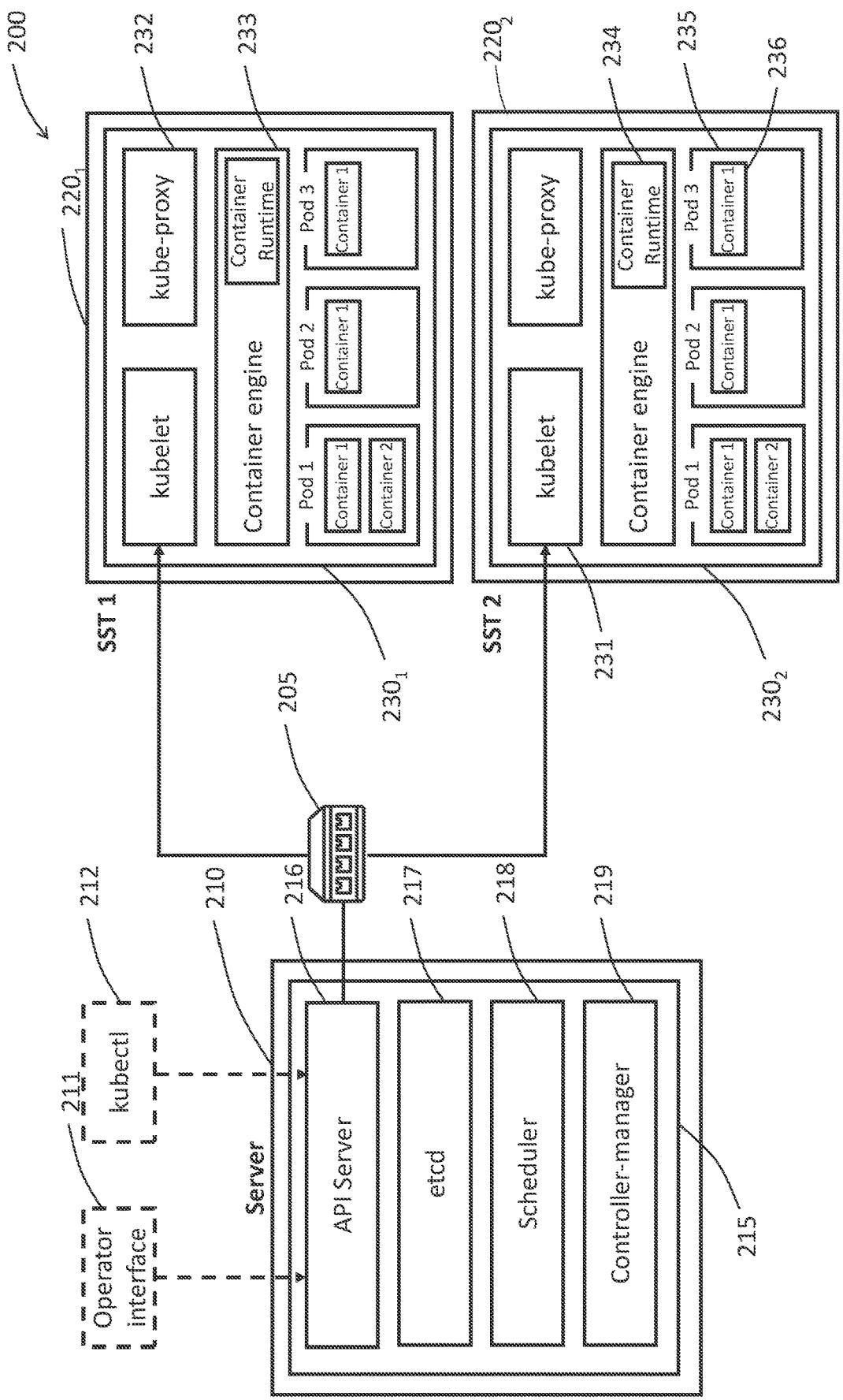
FIG. 2 illustrates a computing system under the control of a Kubernetes orchestration platform.

FIG. 2 illustrates a computing system 200. The computing system has several components under the control of a Kubernetes container orchestration platform. As such, the system may be referred to as a Kubernetes cluster. The Kubernetes cluster includes a server 210, on which a Kubernetes master 215 runs, and self-service terminals (SSTs) $220_1$, $220_2$, on which respective Kubernetes workers $230_1$, $230_2$ run. It will be appreciated that the server 210 may be a physical server or a cloud server. The server 210 and the SSTs communicate over a network 205 such as a local area network or the internet. The network may be wired and/or wireless. It will be appreciated that devices other than SSTs may be connected to the network and run a Kubernetes worker.

The Kubernetes master 215 which runs on the server 210 includes an API server 216 that manages the Kubernetes cluster. The API server 216 issues commands based on information it receives from other internal components of the master 215 and interfaces with external components such as kubectl 212 and kubelets (such as kubelet 231 on SST2 $220_2$) which are running on Kubernetes workers $230_1$, $230_2$. Etcd 217 is a distributed database for the Kubernetes cluster which stores information such as the configuration of the cluster. Etcd 217 also stores the desired state of the Kubernetes workers $230_1$, $230_2$ and the actual state of the Kubernetes workers $230_1$, $230_2$. A state may be understood as being an indication of the pods (such as Pod 3 235 on SST2 $220_2$) and their containers (such as container 236 in Pod 235) that are running on each Kubernetes worker $230_1$, $230_2$ in the cluster. A scheduler 218 monitors when new pods are to be run on a Kubernetes worker and then decides which Kubernetes worker to deploy them on. A controller-manager 219 runs controller processes which attempt to move the actual state of the Kubernetes workers $230_1$, $230_2$ closer to the desired state specified on etcd 217. The master 215 also contains kubectl 212, a command-line tool for communicating with the Kubernetes cluster via the API server 216, and an operator interface 211.

Each Kubernetes worker $230_1$, $230_2$ located within the Kubernetes cluster runs on an SST. According to certain embodiments of the present invention, the worker may run on a virtual machine of the SST. The worker 230 is able to communicate with other workers 230 and the master 215 through the network 205. Each worker 230 has a kubelet that manages the operation of the worker 230. The kubelet (such as kubelet 231 on SST $220_2$) issues commands to the other components of the worker $230_2$, monitors the pods running on the worker (such as pod 235) and their containers (such as container 236), and communicates with the API server 216. The kubelet 231 receives deployment files and ensures that the containers 236 described in those deployment files are running and healthy. A kube-proxy (such as kube-proxy 232) is a network proxy which enables pods, in both the same Kubernetes worker and a different worker to communicate. A container engine (such as engine 233) runs and manages containers, receiving commands from the kubelet and container images from a registry. The container engine prepares container metadata which is passed on to a container runtime (such as container runtime 234), that is responsible for the running of the containers within the Kubernetes worker that the runtime is located within.

A pod exists within any Kubernetes worker after the pod is deployed to a Kubernetes worker by the API server 216 of the Kubernetes master 215. The pod commonly includes a single container although the pod may comprise multiple containers with similar functions, which will share storage and network resources. The pod is able to request access to specific resources available to the worker through the kubelet, or to communicate with other pods by using the kube-proxy.

Figure 3:
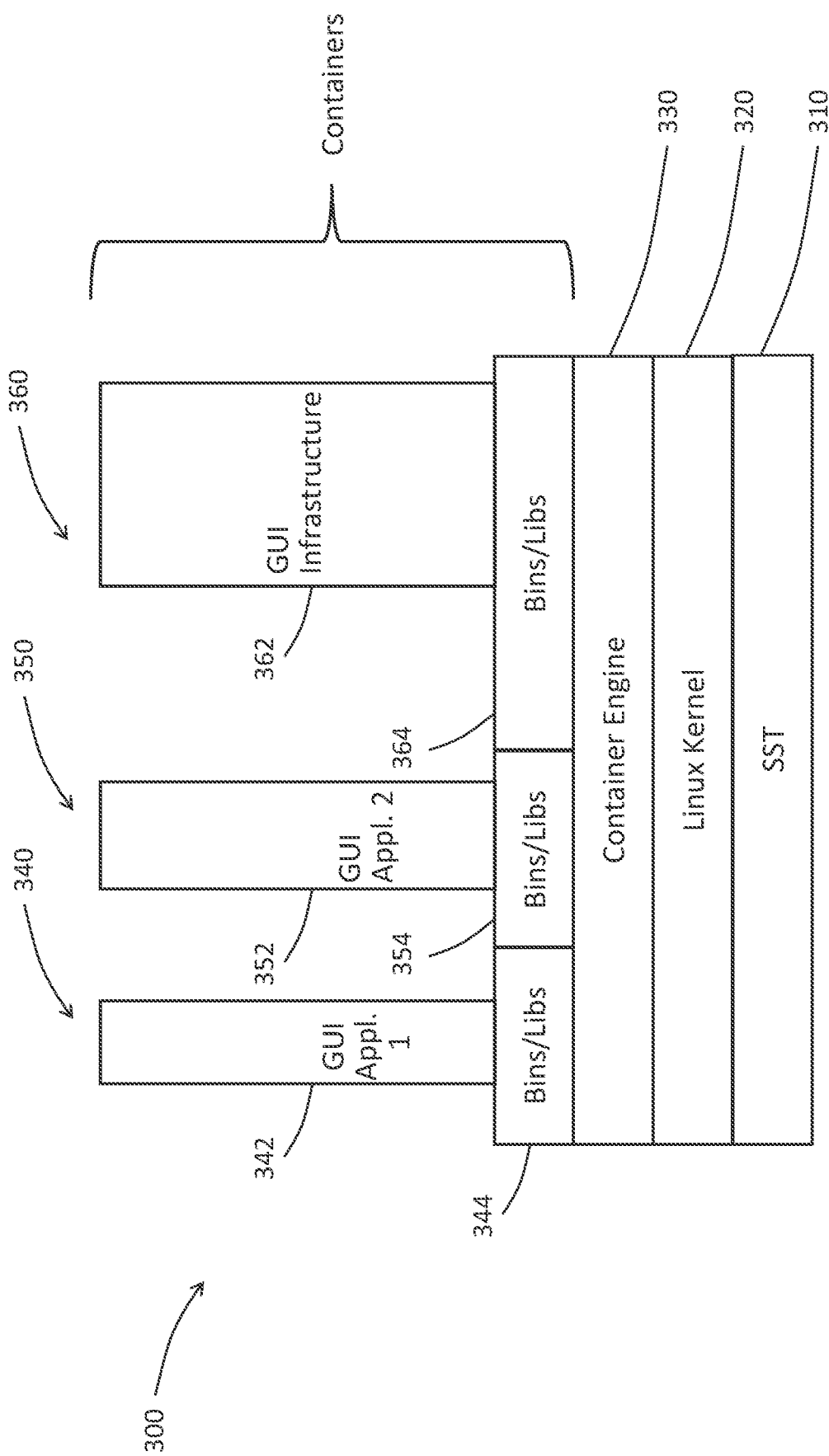
FIG. 3 illustrates a hardware and software architecture for a self-service terminal that executes several software containers.

FIG. 3 illustrates a hardware and software architecture 300 for a self-service terminal that is configured to execute several software container elements. In FIG. 3, the underlying hardware is an SST 310. This may be one of the SSTs described with respect to FIG. 1 or FIG. 2. As described hereinabove, the SST includes one or more processors and at least one memory. The memory stores executable software that is executable by the processors. The executable software includes a Linux kernel 320 which may be part of a Host Operating System (such as Unix or Ubuntu or the like). It will be appreciated that in certain other embodiments of the present invention other kernels and other host operating systems could be utilised (Windows, Mac etc.). Also included as part of the executable software is a container engine 330. The container engine is responsible for accepting user requests or requests from an API server of a container orchestrator (such as Kubernetes, Swarm, Mesos, or the like), pulling image files (in a particular image format) from a registry, preparing a container mount point, preparing metadata that is needed to execute a software container and calling a container runtime. The container runtime (not shown) is a part of the container engine. The container runtime (such as runc, containerd, crun, railcar, katacontainers, or the like) uses the mount point and the metadata provided by the container engine and communicates with the Linux kernel 320 running on the computing device in order to execute several container image files and thereby create several software containers. The executable image files for each of the software containers shown in FIG. 3 may be downloaded from a registry. In FIG. 3, three software container elements are illustrated. A first software container element 340 is referred to as the GUI Application 1 container. The GUI Application 1 container includes application software 342 and associated binaries and libraries 344 (the binaries and libraries may be referred to as software dependencies). The application running in the GUI Application 1 container is a GUI Application that provides a first graphical user interface on the display of the SST 310. A second software container element 350 is referred to as the GUI Application 2 container. The GUI Application 2 container also includes application software 352 and associated binaries and libraries 354 (the binaries and libraries may be referred to as software dependencies). The application running in the GUI Application 2 container is a GUI Application that can present a second graphical user interface on the display at the same time as or alternately to the GUI generated by GUI Application 1. GUI Application 1 and GUI Application 2 may present the same, similar or completely different GUIs. A third software container element 360 is referred to as the GUI Infrastructure container. The GUI Infrastructure container includes application software 362 and associated binaries and libraries 364 (the binaries and libraries may be referred to as software dependencies). The application running in the GUI Infrastructure container includes software that manages the screen and input devices and is used by all GUI Applications. It will be appreciated that according to certain other embodiments of the present invention, the GUI Infrastructure software may not be contained with a software container but may operate outside a containerized environment. As can be seen in FIG. 3, each software container element has its own binaries and libraries (bins/libs). However, it will be appreciated that according to certain other embodiments of the present invention any combination of containers could share bins/libs.

Figure 4:
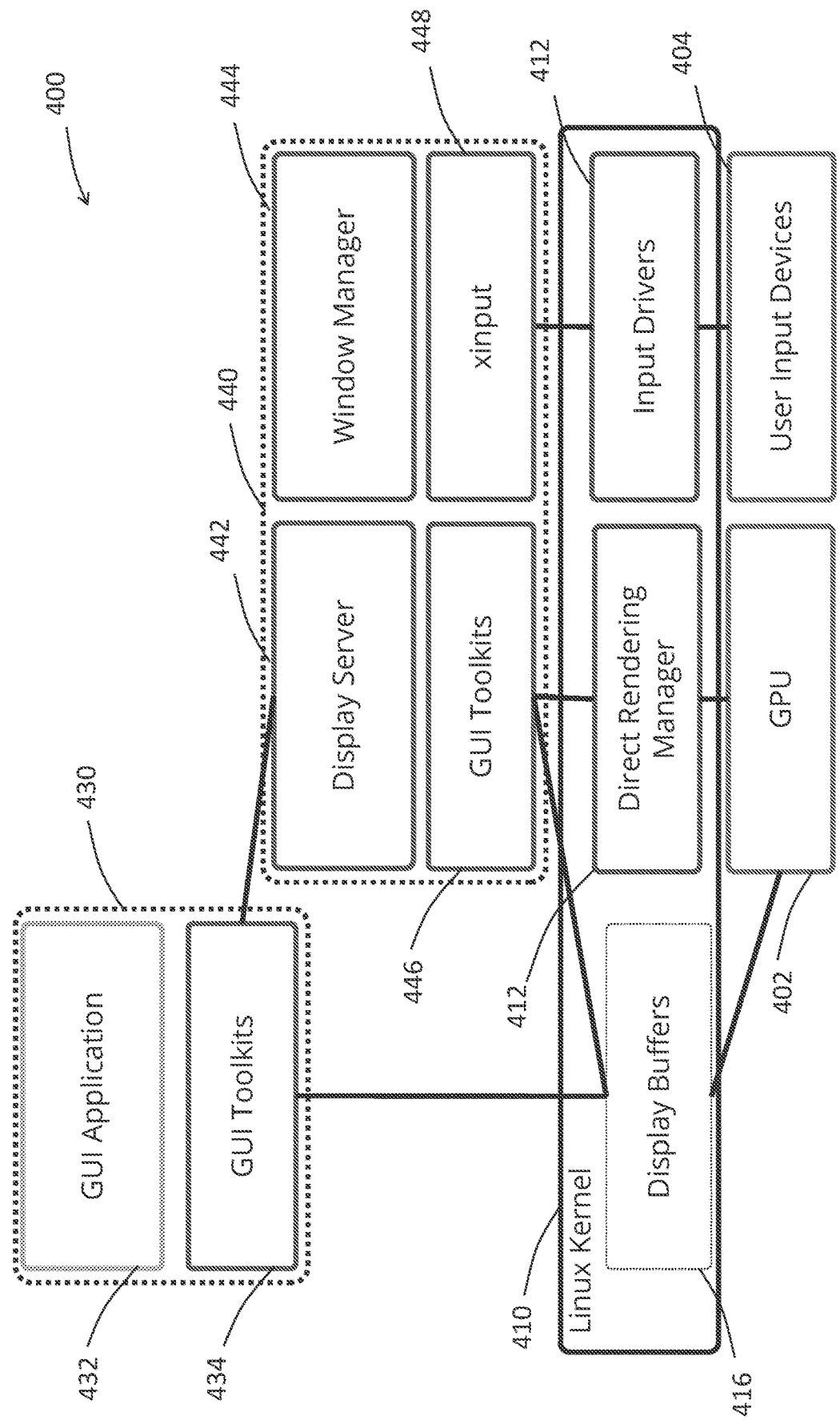
FIG. 4 illustrates a computing device executing a GUI application within a software container.

FIG. 4 illustrates a computing device 400 including hardware and software components. The computing device includes as hardware components a graphical processing unit (GPU) 402 and one or more user input devices 404 (such as keyboard, touchscreen, mouse or the like). The GPU is responsible for rendering the graphical use interface on the display (not shown) of the computing device. The user input devices enable a user to interact with the graphical user interface. The computing device includes a Linux kernel 410 as a software component. The Linux kernel includes a direct rendering manager 412 and input drivers 414. The Direct Rendering Manager is a component of Linux that allows applications to control the GPU. The Input drivers are Linux device drivers for input devices such as those handled by xinput (explained below). Of course, according to certain other embodiments of the present invention non-Linux based systems can be used and corresponding components can be used in these systems. Also within the Linux kernel are one or more display buffers 416. The Display buffers are regions of RAM on the computing device where GUI Applications write their bitmaps before sending them to the GPU for display.

Also executing on the computing device (i.e., on one or more processors of the computing device) is a first software container element 430 and a second software container element 440. The first software container element contains executable software associated with a GUI Application 432 (such as firefox, chrome, Spotify, a proprietary UI or the like). The first software container element also contains executable software associated with one of more GUI toolkits 434 (such as Xlib, XCB, Open GL or the like). The GUI Toolkits are software, usually a shared library, that is used by the GUI Application to draw to the screen. As discussed above, the GUI application 432 is responsible for providing the graphical user interface (or the display instructions that cause the GUI to be displayed) that is to be rendered on the display of the computing device. The GUI Application 432 can use capabilities exposed by the display server (explained below) but can also render directly to display buffers. For example, the GUI Application 432 can communicate with the second software container element 440 and provide display instructions to this second software container element. These instructions can be processed by the second software container element and provided to a display buffer. Thereupon, the display buffer can send commands to the GPU to enable the GPU to generate the graphical user interface that is to be displayed on the display. Alternatively, the display instructions generated by the GUI Application 432 can be provided directly to the display buffer 416 without having to interact with the second software container element. Of course, in certain embodiments, a combination of both approaches could be utilised according to need. The GUI container 430 is provided by executing a first executable image file (not shown) on the processor(s) of the computing device. The image file includes the executable software that defines the GUI application. The image file also includes the executable software that defines the GUI Toolkits.

The second software container element 440 contains the executable software associated with certain GUI infrastructure components. The GUI infrastructure container includes all of the software that manages the display and input devices and is used by the GUI Application. The GUI infrastructure container 440 is provided by executing a second executable image file (not shown) on the processor(s) of the computing device. The image file includes the executable software that defines the GUI infrastructure components. Particularly, the executable software within the GUI Infrastructure container (and thus image file) includes software associated with a display server 442, a window manager 444, one or more GUI toolkits 446, and an xinput module 448. The GUI infrastructure container 440 is also provided by executing a second executable image file (not shown) on the processor(s) of the computing device. The image file includes the executable software that defines the display server, the window manager, GUI toolkits and xinput module. The display server 442 coordinates input and output of GUI Applications across the display and input hardware. For example, the display server may be an Xorg display server or a Wayland display server or the like. The Window Manager controls the placement and appearance of windows containing GUI applications on the display (e.g., whether they are minimized, maximized, and the size and/or position of the window). The Window Manager may be an Openbox Window Manager or the like. The xinput module or subsystem handles input devices such mice, keyboards and touchscreens. The GUI Toolkits (such as Xlib, XCB, Open GL or the like) are software, usually a shared library, that is used by the GUI infrastructure to draw to the screen. As noted above, whilst the GUI infrastructure is shown in a software container element, according to certain other embodiments of the present invention the GUI infrastructure need not be provided in a software container. When a user interacts with the computing device via a user input device, this is detected via the xinput module which communicates with and receives commands from the input drivers running on the kernel. These commands are then transmitted from the GUI infrastructure container to the GUI application container whereupon the GUI application can make necessary modifications to the GUI based on the input commands. The GUI application does this by sending updated display instructions to the display buffer (either directly or via the GUI infrastructure) for provision to the GPU.

The first and second software container element can each be configured such that they are able to communicate with the display, the user input devices and each other. This may be achieved via use of a Resource Manager Device Plugin (not shown) that can be used to securely expose display and input hardware into the containers. Furthermore, the GUI infrastructure container can mount one or more communication socket addresses (e.g., an Xorg socket) into the GUI Application container to expose capabilities of the GUI infrastructure to the overlying GUI applications.

The executable image files for the first and second software containers can be built via conversion of non-containerised sandbox applications (e.g., Flatpak) into an executable image file. This enables rapid availability of many different GUIs for inclusion within a software container environment.

Figure 5:
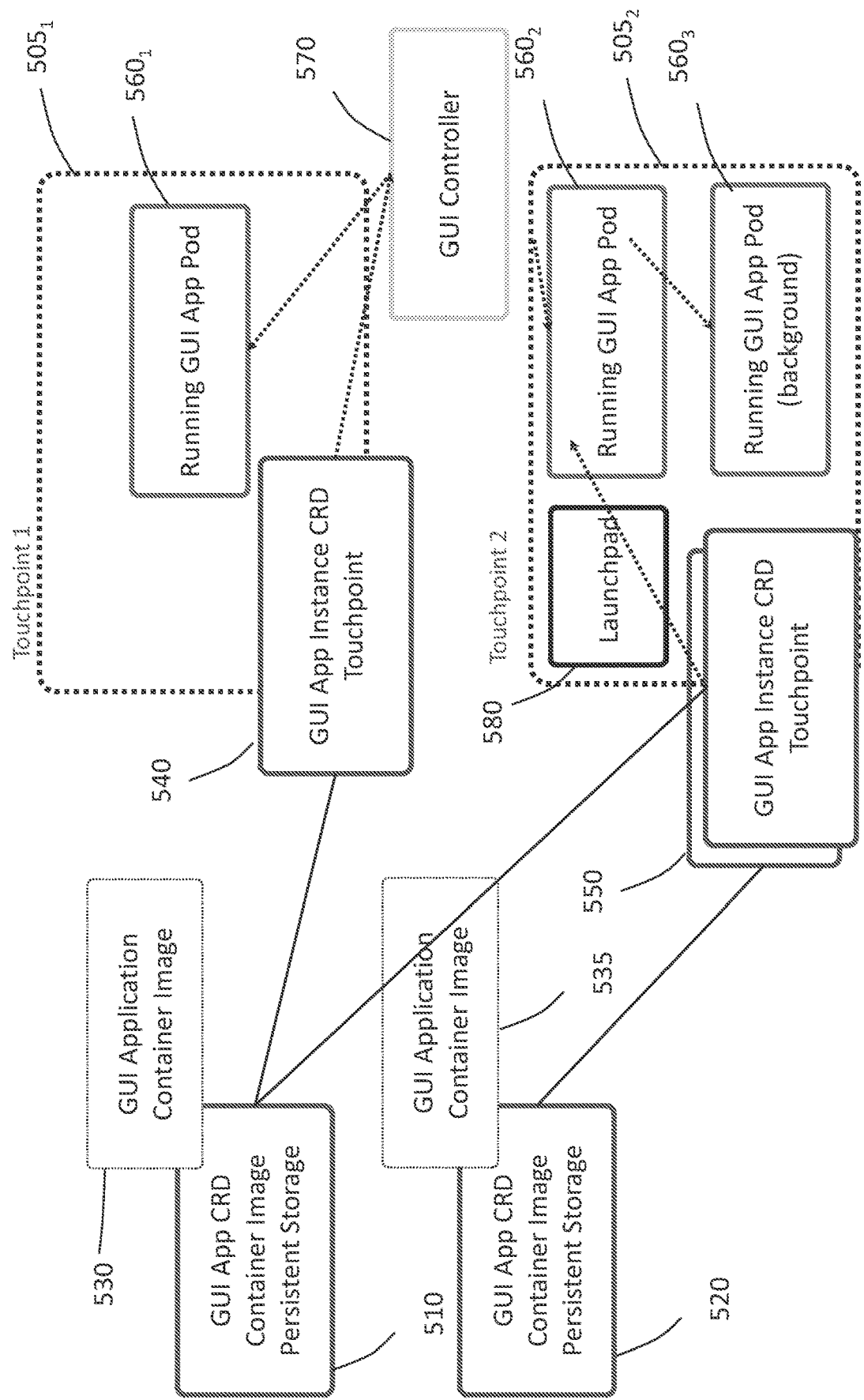
FIG. 5 illustrates a diagram for how GUI applications for execution within software containers can be abstracted.

FIG. 5 illustrates a diagram showing how GUI containers can be abstracted in a computing system including two touchpoints (i.e., terminals) $505_1$, $505_2$. In certain other embodiments, a different number of touchpoints may be present. FIG. 5 illustrates how Kubernetes Custom Resources can be used for this purpose. These Kubernetes custom resources are a class of object used to extend the Kubernetes data-model and API to add new scenario specific capabilities to Kubernetes. In particular, FIG. 5 shows a first GUI application Custom Resource Definition (CRD) 510 and a second GUI application CRD 520. The GUI application CRDs are objects in the Kubernetes data-model representing particular GUI applications that can be launched on touchpoints/terminals/kiosks in the cluster. The term CRD means the definition of a particular kind of custom resource including its properties and status (e.g., defines its container image, persistent storage requirements, whether sound or D-BUS capability is required etc). Each of the GUI Application CRDs 510, 520 are associated with a GUI Application Container Image 530, 535 which contains the executable software that causes execution of a software container on a terminal. The GUI Application Container Images 530, 535 are thus the container images for those particular GUI applications. These container images can be stored in memory on a remote server (e.g., running the Kubernetes master) and/or on each of the touchpoints. When providing these images to a terminal for execution, they may be referred to as a GUI application instance CRDs 540, 550. In other words, an object in the Kubernetes data-model representing an instance of a particular GUI application running on a specific touchpoint/terminal. These GUI application instance CRDs define the target touchpoint and whether the app is active (should have focus). The GUI App pods $560_1$, $560_2$, $560_3$ show the GUI applications that are running within containers on the two touchpoints/terminals. A GUI controller 570 is also provided. This is a Kubernetes plugin that monitors GUI App and GUI App Instance CRDs and performs the necessary actions to launch and manage the required GUI applications on the specified touchpoint. This is explained below.

When a particular GUI application container is running and active on a touchpoint (e.g., Touchpoint 1), some monitor component (such as launchpad 580 and/or another management application) monitors for the detection of predetermined events such as a specified user interaction, a software trigger, or some other trigger. For example, this predetermined event may be the interaction between a user and the touchpoint which triggers a further GUI to be required (such as for a staff member to input a PIN for ID verification). Upon detection of such a predetermined event that causes the monitor component to determine that another GUI application is required (i.e., that a new GUI needs to be started), the monitor component creates a new GUI application Instance CRD thus linking a GUI Application CRD to a particular touchpoint. The GUI Controller 570 detects the creation of the new GUI Application Instance CRD and creates the appropriate Pod spec in a Kubernetes API server (when Kubernetes is used) in order for the GUI application defined in the GUI Application CRD to be started on the touchpoint. The relevant image file associated with the GUI App CRD is thus provided to the necessary touchpoint to be executed as a GUI application pod. By executing this other GUI application pod, and making it the active application, a further GUI is provided on the display as needed. It will be appreciated that when this happens, the previous GUI may be minimized or have its size and/or position controlled. The previous GUI may also be moved into the background whilst the new application takes focus (see Touchpoint 2 in FIG. 5). The GUI container for the original GUI may also be terminated. When all of the steps needed for the new GUI have been taken (e.g., the staff has finished verifying ID and entering their PIN), the monitor component can also detect this event and determine that the original GUI should then be displayed (either by switching the active GUI or re-executing the necessary image file as a new GUI container). It is also noted that the executable image file for the GUI application instance CRD can be assembled statically or dynamically. In the event of dynamic assembly, when the monitor component (e.g., launchpad 580) detects a predetermined event subsequently causing the GUI controller to create a Pod spec in the Kubernetes API server, the new image file for the Pod can be assembled 'on the fly' according to the needs specified by the GUI controller.

Figure 6:
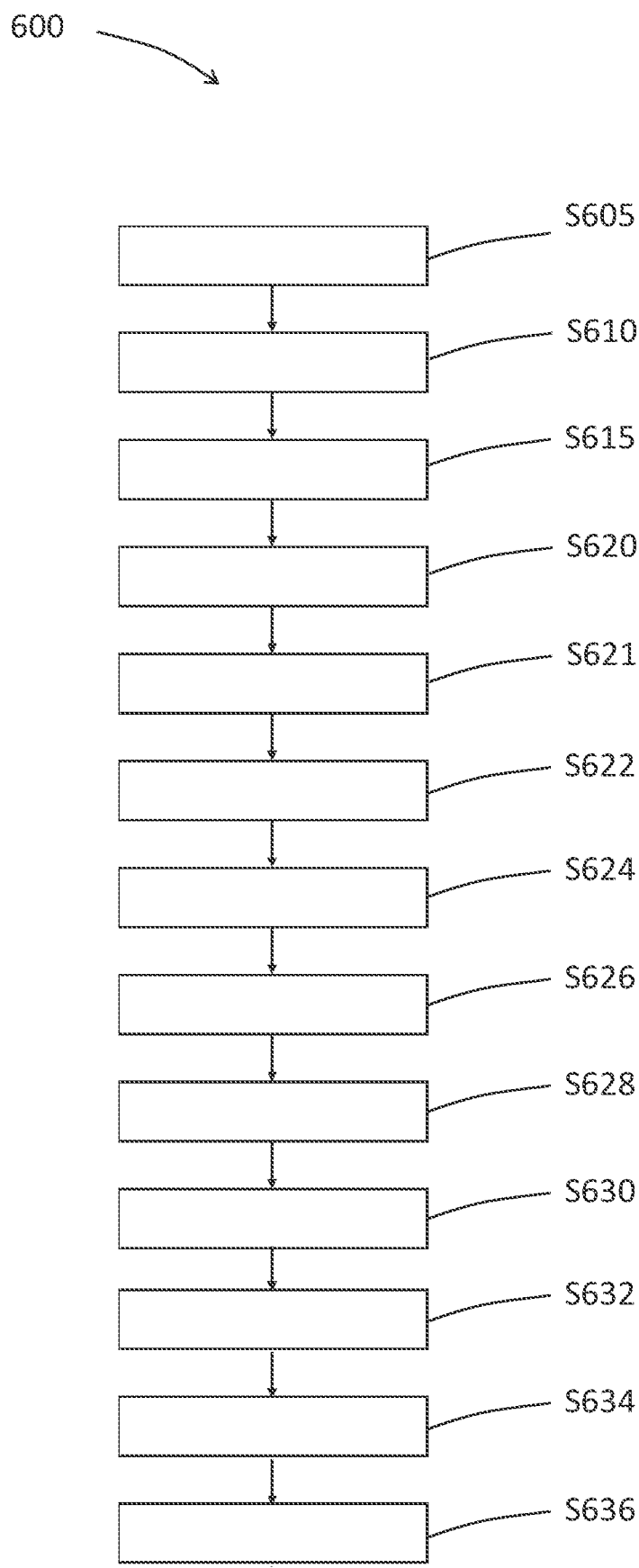
FIG. 6 illustrates a flow chart describing certain steps taken for executing a GUI application in a software container.

FIG. 6 illustrates a flow chart of certain steps that take place during the assembly and running of a GUI application in a container environment on an SST. The SST may be any of the SSTs illustrated in the preceding Figures. When the SST is initially deployed, the necessary software including a Linux kernel, Kubernetes worker distribution, and the like is installed. It will be appreciated that in some embodiments, a different kernel (host OS) may be used. It will be appreciated that in some embodiments, any containerisation software may be used. During the configuration of the SST, a GUI infrastructure container is installed. It will be appreciated that in other embodiments, the GUI infrastructure may be installed directly on the kernel instead of installing the GUI infrastructure in a container. In other words, in some embodiments, the GUI infrastructure may not be implemented by containerisation. It will be appreciated that in some embodiments, other software may be installed at the same time as the GUI infrastructure container.

A first step S605 is powering on the pre-configured SST. This occurs for example when the terminal is first used that day, such as when a supermarket with SSTs is opened for business. The software on the SST, including the host OS and the Kubernetes worker configuration is then loaded from the memory of the SST and executed by processors of the SST. In some embodiments, at this stage, the GUI infrastructure will be loaded from the memory of the SST and executed by the processors of the SST outside of the Kubernetes worker configuration. Thereafter, a next step S610 involves detecting, by a controller-manager of the Kubernetes master, a difference between pods that should be executing on a Kubernetes worker associated with the SST as specified according to the etcd databased and the pods that are actually executing on the SST. The available resources on the Kubernetes worker will also be checked to determine that the resources required by a pod are available on the Kubernetes worker. Responsive to detecting that pods that should be executing on the SST are not, and that suitable resources are available, the API server of the Kubernetes master sends information to a kubelet on the SST to resolve this inconsistency. This information includes a deployment file for each pod that is to be executed on the SST. It will be appreciated that according to certain other embodiments of the present invention that do not use the Kubernetes orchestration platform, containers may be executed without the need for being run within pods (which are a particular feature of the Kubernetes system). A next step S615 involves receiving, by the kubelet of the Kubernetes worker, the information from the API server and initialising a corresponding Pod on the Kubernetes worker. In the step S615, a deployment file is received by the Kubernetes worker. The deployment file details the configuration, including executable image file, resource requirements and the like of a Pod containing a GUI infrastructure container. The GUI infrastructure container may correspond to the second software container element 440. The GUI infrastructure container is provided access by the kubelet to Linux kernel resources including direct rendering manager, input drivers, and the like. Once the GUI infrastructure container is running, it will continue to run until it encounters a problem or the SST is powered off. In some embodiments, a Desktop Bus (D-Bus) server and proxy container image may be detailed in another deployment file. The D-Bus allows GUI Application containers to share data with each other. It will be appreciated that in other embodiments, any number of deployment files may be received by the Kubernetes worker from the Kubernetes master. By changing the deployment files sent to the Kubernetes worker, it is possible to quickly update software elements running on the worker.

Steps S620 to S628 describe the stages of building and initialising a GUI application container. It will be appreciated that any number (e.g., one, two, three or more) of GUI application containers may be built and initialised on a specific terminal. A step S620 involves identifying dependencies of the GUI application. A step S621 involves creating a container image (docker compose YAML file). It will be appreciated that in other embodiments, the docker compose YAML file may be replaced by any standardised application definition file. The container image includes a base OS image, any dependencies, and the required GUI application. The container image may be saved as a GUI Application Container Image, forming part of a GUI Application Custom Resource Definition (CRD) in the Kubernetes master for recall at a later date. In a step S622, a monitor component running on the terminal (touchpoint) determines that a new GUI is needed and thus that a new GUI Application needs to be started. The monitor component then creates, in a step S624, a new GUI Application Instance CRD linking a GUI Application CRD to a particular touchpoint/terminal. The GUI Application Instance CRD records whether the GUI Application is active. Whilst the GUI Application Instance CRD records the GUI application as active, the GUI application is interactable through hardware inputs received by xinput via input drivers in the Linux kernel and sent to the GUI application. Thereafter, in a step S626, a GUI Controller detects the creation of the new GUI Application Instance CRD and creates the appropriate Pod spec in the Kubernetes API server in order for the GUI application defined in the GUI Application CRD to be started on the touchpoint. This involves creating a deployment file. The deployment file (Pod spec) includes the container image created in step S621, resource requirements, an X server socket, storage mounts, which Kubernetes worker(s) to run on and the like. In some embodiments, the Xorg server socket may be a different display server protocol such as Wayland, or the like. A step S628 involves sending, via the API-server of the Kubernetes master, the deployment file created in step S626 to the kubelet of the Kubernetes worker(s) specified in the deployment file. A step S630 then involves creating a GUI application Pod on the Kubernetes worker. The GUI application Pod contains the GUI Application container.

Some time after step S630, in a step S632 a predetermined event causes the monitor component to detect that another GUI application is required and thus to create, in a step S634, a new GUI Application Instance CRD linking a GUI Application CRD to a particular touchpoint/terminal. It will be appreciated that the predetermined event may include hardware inputs, software commands, or the like. Following creation of the new GUI Application Instance CRD, the active GUI application described in steps S620 to S630 may be moved to a background and a previously background GUI application be made active. That is to say that in some instances, the required GUI application may already be running in a GUI application pod. Accordingly, the newly created GUI App Instance CRD may be an updated GUI App Instance CRD where the required GUI application is recorded as being active. In this case, the GUI App Instance CRD for the previously active GUI application may be updated to be recorded as background. This change in status will be reported to a window manager of the GUI infrastructure container, which will make the required GUI application visible and interactable through hardware inputs received via xinput. It will be appreciated that if there is no previously background GUI application container running, then the GUI Controller may, in a step S636, detect the creation of the new GUI Application Instance CRD and create the appropriate Pod spec in the Kubernetes API server in order for the GUI application defined in the GUI Application CRD to be started on the touchpoint. It will also be appreciated that instead of moving the active GUI application to a background, it may be terminated or the position, size and/or minimized status may be controlled.

FIG. 6 has demonstrated how the self-service terminal (SST) may be configured as the Kubernetes worker and include the GUI infrastructure container, GUI application containers, GUI Application Instance CRDs, and the like, and be associated with GUI Application CRDs, GUI Application Container Images, the GUI controller, and the like. It will be appreciated that in some embodiments, the self-service terminal may be any computing device capable of being a Kubernetes worker. In some embodiments an alternative container orchestration system to Kubernetes may be used. In other embodiments, any number of GUI application pods containing GUI applications may be running on a Kubernetes worker. In some embodiments, there may be no predetermined events.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The invention claimed is:

1. A computer-implemented method for providing a graphical user interface on a display of a computing device, comprising the steps of:
   receiving, from a container image registry and at a computing device, at least one first executable image file as at least one first software container element comprising first executable software associated with a graphical user interface application;
   executing the first executable image file that contains the first executable software and that is executable on one or more processors of the computing device; and
   responsive to executing the first executable image file, providing a first graphical user interface on a display of the computing device.

2. The method as claimed in claim 1, further comprising:
   providing a second executable image file comprising second executable software associated with graphical user interface infrastructure components that support the graphical user interface application; and
   executing the second executable image file as a second software container element that contains the second executable software and that is executable on said one or more processors of the computing device.

3. The method as claimed in claim 2, further comprising:
   providing the second executable image file comprises providing the second executable image file as an image file that comprises executable software associated with a display server.

4. The method as claimed in claim 2, further comprising:
   providing the second executable image file comprises providing the second executable image file as an image file that comprises executable software associated with a windows manager.

5. The method as claimed in claim 2, further comprising:
   providing the second executable image file comprises providing the second executable image file as an image file that comprises executable software associated with one or more graphical user interface toolkits.

6. The method as claimed in claim 2, further comprising:
   providing the second executable image file comprises providing the second executable image file as an image file that comprises executable software associated with a user interface input manager.

7. The method as claimed in claim 2, further comprising:
   via the second software container element, mounting one or more communication socket addresses into the first software container element to enable communicate between the first and second software container element.

8. The method as claimed in claim 2, further comprising:
   at the second software container element, receiving one or more user input commands associated with inputs from one or more user input devices;
   transmitting said input commands from the second software container element to the first software container element; and
   responsive to transmitting, providing updated display instructions from the first software container element to cause the first graphical user interface to be updated.

9. The method as claimed in claim 1, further comprising:
   providing the first executable image file as an image file that comprises executable software associated with the graphical user interface application and one or more graphical user interface toolkits.

10. The method as claimed in claim 1, further comprising:
    building one or more respective first executable image files by converting one or more respective pre-determined non-software container element based sandbox implementations of the respective graphical user interface application into respective executable image files.

11. The method as claimed in claim 1, further comprising:
    storing, in at least one memory on the computing device and/or in a remote server, a plurality of executable image files each comprising respective executable software associated with a respective graphical user interface application for providing a respective graphical user interface.

12. The method as claimed in claim 11, further comprising:
    providing, at the computing device, the first executable image file from the plurality of executable image files stored in said memory;
    executing the first executable image file as the first software container element; and
    thereby providing the first graphical user interface on the display.

13. The method as claimed in claim 11, further comprising:
    responsive to detecting a predetermined event on the computing device, executing at least one other executable image file, from the plurality of executable image files, and different to the first executable image file, as at least one other software container element on said one or more processors of the computing device; and
    responsive to executing the other executable image file, providing a second graphical user interface on the display of the computing device.

14. The method as claimed in claim 13, further comprising:
    responsive to executing said other executable image file, terminating the first software container element or minimizing or controlling a size and/or position of the first graphical user interface or moving the first graphical user interface into a background whilst the second graphical user interface is active.

15. The method as claimed in claim 13, further comprising:
    responsive to said detecting of the predetermined event, dynamically assembling the other executable image file for execution as said other software container element.

16. The method as claimed in claim 1, further comprising:
    configuring the first software container element such that it is able to communicate with the display, the second software container element and one or more user input devices.

17. The method as claimed in claim 1, further comprising:
    via the first software container element, providing display instructions directly to a display buffer executing on a kernel of the computing device; and
    responsive to providing the display instructions, commanding, via the display buffer, a graphical processing unit to provide the first graphical user interface on the display;
    or,
    via the first software container element, providing display instructions directly to the second software container element;
    via the second software container element, providing said display instructions to a display buffer executing on a kernel of the computing device; and
    responsive to providing the display instructions to the display buffer, via the display buffer, commanding a graphical processing unit to provide the first graphical user interface on the display.

18. A computing device comprising a display for providing a graphical user interface, comprising:
one or more processors configured to:
receive, from a container image registry, at least one first executable image file as at least one first software container element comprising first executable software associated with a graphical user interface application
execute the at least one first executable image file, to thereby provide a first graphical user interface on the display of the computing device.

19. The computing device as claimed in claim 18, wherein the computing device is a point of sale terminal or self-service terminal or kiosk.

20. A computer program product comprising a non-transitory computer-readable storage medium storing instructions thereon which, when executed by a computing device, cause the computing device to perform operations comprising:
receiving, from a container image registry and at the computing device, at least one first executable image file as at least one first software container element comprising first executable software associated with a graphical user interface application;
executing the first executable image file that contains the first executable software and that is executable on one or more processors of the computing device; and
responsive to executing the first executable image file, providing a first graphical user interface on a display of the computing device.

* * * * *